United States Patent
Amano (10) Patent No.: US 12,429,965 B2
(45) Date of Patent: Sep. 30, 2025

(54) INPUT DEVICE AND METHOD FOR DETERMINING INSTALLATION POSITION OF OPERATING ELEMENT

(71) Applicant: ALPS ALPINE CO., LTD., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/911,467

(22) Filed: Oct. 10, 2024

(65) Prior Publication Data

US 2025/0123700 A1 Apr. 17, 2025

(30) Foreign Application Priority Data

Oct. 17, 2023 (JP) .................................. 2023-178579

(51) Int. Cl.
- *G06F 3/0362* (2013.01)
- *G06F 3/039* (2013.01)
- *G06F 3/044* (2006.01)

(52) U.S. Cl.
CPC .......... *G06F 3/0362* (2013.01); *G06F 3/0393* (2019.05); *G06F 3/044* (2013.01)

(58) Field of Classification Search
CPC ....... G06F 3/0362; G06F 3/0393; G06F 3/044
See application file for complete search history.

(56) References Cited

U.S. PATENT DOCUMENTS

| 10,556,507 | B2* | 2/2020 | Park | B60K 35/60 |
|---|---|---|---|---|
| 11,221,692 | B2* | 1/2022 | Takaoka | G06F 3/0393 |
| 11,467,696 | B2* | 10/2022 | Korherr | G06F 3/03547 |
| 11,579,665 | B2 | 2/2023 | Hinson et al. | |
| 11,604,083 | B2* | 3/2023 | Mochiji | G06F 3/0362 |
| 11,650,675 | B2* | 5/2023 | Martin | G06F 3/0393 |
| | | | | 345/156 |
| 2018/0154774 | A1* | 6/2018 | Park | B60K 35/10 |
| 2020/0019263 | A1* | 1/2020 | Korherr | G06F 3/044 |
| 2020/0272325 | A1 | 8/2020 | Furumoto et al. | |
| 2020/0319722 | A1* | 10/2020 | Martin | H03K 17/975 |

(Continued)

FOREIGN PATENT DOCUMENTS

| EP | 4036694 | 8/2022 |
|---|---|---|
| JP | 2020-126384 | 8/2020 |

(Continued)

OTHER PUBLICATIONS

Extended European Search Report for 24205346.0 mailed on Feb. 19, 2025.

*Primary Examiner* — Michael Pervan
(74) *Attorney, Agent, or Firm* — IPUSA, PLLC (57) ABSTRACT

An input device capable of determining an installation position of an operating element is provided. A knob includes a fixed part attached to a touch sensor/a cover glass via an adhesive, a rotating part rotatably attached to the fixed part via a rotation shaft, and a conductor provided inside the rotating part. The conductor includes a pair of columnar parts that can be detected by the touch sensor. The columnar parts are positioned diagonally to each other. The input device detects the positions of the columnar parts based on change in capacitance when the knob is operated, and determines the installation position of the knob based on the detected positions.

8 Claims, 8 Drawing Sheets

(56) References Cited

U.S. PATENT DOCUMENTS

| | | | |
|---|---|---|---|
| 2021/0200337 A1* | 7/2021 | Takaoka | G06F 3/0393 |
| 2022/0057237 A1* | 2/2022 | Mochiji | G06F 3/044 |
| 2023/0367432 A1 | 11/2023 | Park et al. | |

FOREIGN PATENT DOCUMENTS

| | | |
|---|---|---|
| JP | 2021-071876 | 5/2021 |
| JP | 7003225 | 1/2022 |
| JP | 2022-544231 | 10/2022 |
| KR | 102520994 | 4/2023 |
| WO | 2019/180774 | 9/2019 |

* cited by examiner

FIG.1A PRIOR ART

PLAN VIEW

FIG.1B PRIOR ART

SIDE VIEW

FIG.1C PRIOR ART

ROTATION OPERATION

SCHEMATIC
PLAN VIEW

FIG.10B

SCHEMATIC
PLAN VIEW

FIG.11A

KNOB IS MOUNTED ON COVER GLASS

FIG.11B

CALIBRATION MODE IS INITIATED, AND
KNOB IS FULLY ROTATED ONCE

FIG.11C

CENTER POINT IS CALCULATED BASED ON CIRCULAR
MOVEMENT LOCI FORMED BY MOVES OF DETECTED POINTS

INPUT DEVICE AND METHOD FOR DETERMINING INSTALLATION POSITION OF OPERATING ELEMENT

CROSS-REFERENCE TO RELATED APPLICATION

The present application claims priority under 35 U.S.C. § 119 to Japanese Patent Application No. 2023-178579, filed Oct. 17, 2023, the contents of which are incorporated herein by reference.

BACKGROUND OF THE INVENTION

Field of the Invention

The present invention relates to an input device having a human-machine interface function, and more particularly to an input device including a touch panel and an operating element.

Description of the Related Art

Figure 1A:
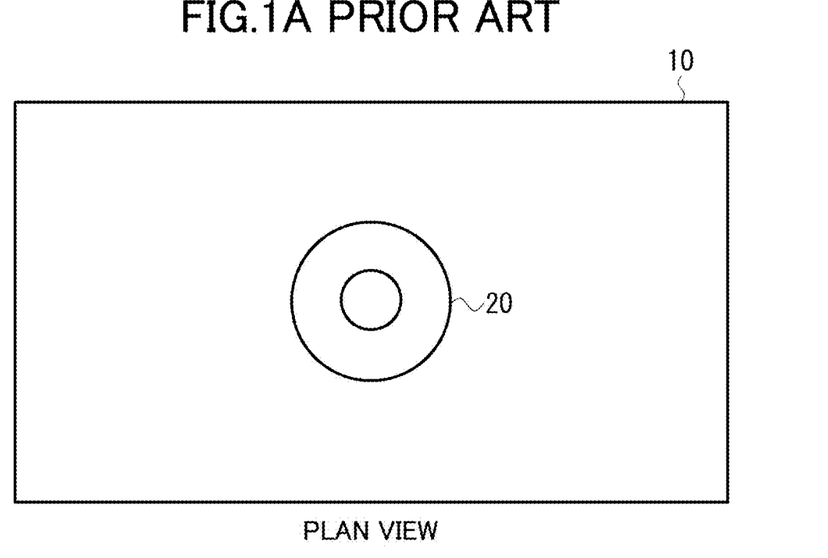
FIG. 1A is a view schematically illustrating the entire configuration of an existing knob on display (KoD)
Figure 1B:
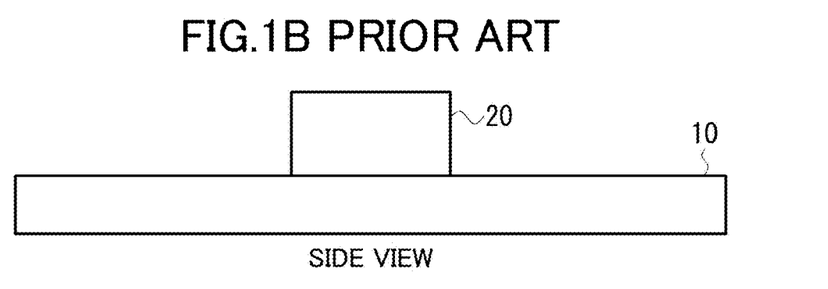
FIG. 1B is a view schematically illustrating the entire configuration of an existing knob on display (KoD)
Figure 1C:
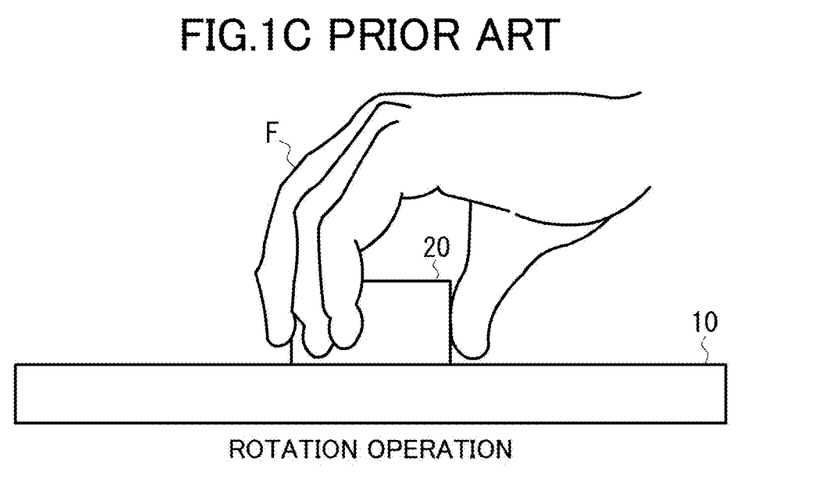
FIG. 1C is a view schematically illustrating the entire configuration of an existing knob on display (KoD)

Practical application of a Knob on Display (KoD) including buttons and knobs on a capacitance-type touch panel display is in progress (for example, Japanese Patent Application Laid-Open Publications Nos. 2020-126384 and 2021-71876). For example, as illustrated in FIGS. 1A and 1B, a knob 20 is attached to the surface of a touch panel 10. The knob 20 is an operating element having a rotation mechanism like a mechanical switch, and as illustrated in FIG. 1C, a user pinches the knob 20 with fingers F and rotates the knob 20 to perform, for example, input of the amount of rotation or the like.

The KoD of Japanese Translation of PCT International Application Publication No. 2022-544231 includes a push electrode pad and a rotary electrode pad on the bottom side of a main body made of an electrically insulating material (for example, acrylic) or the like, and these electrodes are rotatably fixed close to a touch screen. The position and the angle of the KoD, and/or button depression via the KoD are detected by a control circuit (e.g., a microcontroller) via a touch sensor panel.

The KoD of Japanese Patent No. 7003225 includes a substantially cylindrical knob, and three conductive columns are provided inside the knob. The three conductive columns are detected as three touch points on a touch panel while the knob is positioned on the display area of the display.

Figure 2A:
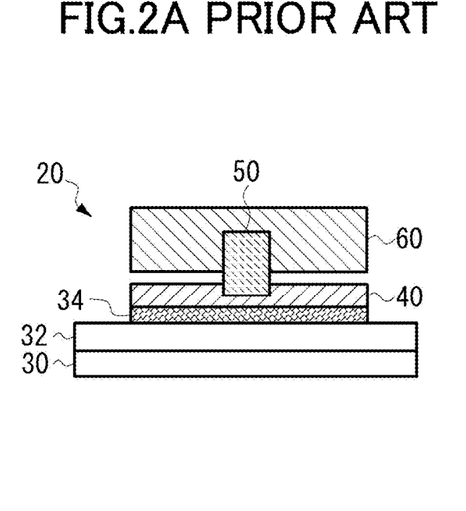
FIG. 2A is a schematic cross-sectional view illustrating an example of a rotation mechanism of a knob.
Figure 2B:
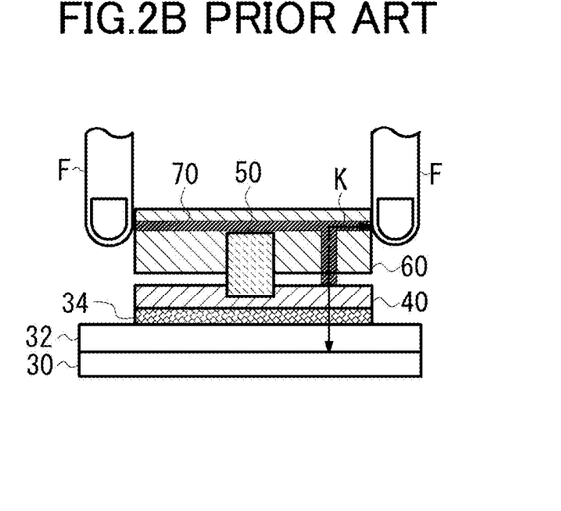
FIG. 2B is a schematic cross-sectional view illustrating an example of a rotation mechanism of a knob.

FIGS. 2A and 2B are schematic cross-sectional views illustrating an example of a rotating mechanism of a knob of a KoD. A cover glass 32 is situated on a touch sensor 30, and a knob 20 includes a cylindrical fixed part 40 fixed by an adhesive 34 on the cover glass 32, and a cylindrical rotating part 60 rotatably attached to the fixed part 40 via a shaft 50. In order to detect the rotation of the rotating part 60, a conductor 70 as illustrated in FIG. 2B is provided inside the rotating part 60. When the knob 20 is pinched with fingers F, a conductive path K to the touch sensor 30 is formed through the conductor 70, and this allows the position of the conductor 70 to be detected by the touch sensor 30.

SUMMARY OF THE INVENTION

A knob of a KoD is detachably attachable and can be installed on the display as a retrofitting part. Therefore, the knob is highly customizable, allowing change of the installation position on the touch panel or replacement of the knob itself with another one having a different design. Owing to the customizability of the KoDs, it is assumed that a knob may be replaced with a variety of knobs depending on the vehicle types or users' preferences.

Figure 3:
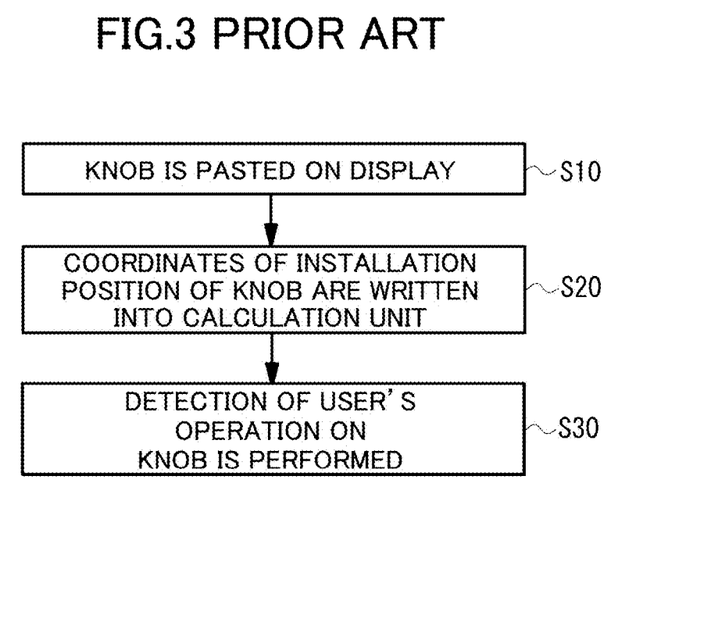
FIG. 3 is a flowchart illustrating an existing flow of changing or updating an installation position of a knob when the knob is installed.

Here, there is a case where one may wish not only to change the knob to a different shaped one but also to freely change the installation position of the knob with respect to the entire surface of the display. An existing flow of changing or updating the installation position of the knob is illustrated in FIG. 3. First, the user pastes a retrofitting knob or a replacement knob on the display with an adhesive or the like (step 10). Next, the user performs an input process for writing the coordinates of the installation position of the knob into a calculation unit configured to detect an operation on the knob (step 20). After the coordinates of the installation position are written, detection of any user's operation on the knob is performed (step 30).

As described above, every time a knob is newly attached, the user has to write the coordinates of the installation position of the knob into the calculation unit side and update the previous coordinates, which involves a lot of labor and impairs the customizability by imposing a burden on the replacement of the knobs. As can be appreciated from what has been described, there is a need for a method that facilitates updating the installation position of the knob upon attachment of the knob.

The present invention aims for solving the existing problems described above, and an object of the present invention is to provide an input device that can determine the installation position of an operating element.

An input device according to the present invention includes: a display including a capacitance-type touch sensor; an operating element rotatably attached to the display, the operating element including therein at least one conductive member that can capacitively couple to the touch sensor and is configured to be rotationally moved when the operating element is rotated; a detection means configured to detect a position of the at least one conductive member based on a change in capacitance when the operating element is operated; and a determination means configured to determine an installation position of the operating element based on the position of the at least one conductive member detected by the detection means.

In one aspect, the at least one conductive member is disposed diagonally with respect to a center of rotation of the operating element, the detection means detects the position, of the at least one conductive member, that is defined diagonally, and the determination means calculates a center point of the position, of the at least one conductive member, that is defined diagonally and detected, and determines the center point that is calculated, as the installation position of the operating element.

In one aspect, the detection means detects a locus of the position of the at least one conductive member being rotationally moved, and the determination means calculates a center of rotation of the at least one conductive member based on the locus of the position of the at least one conductive member that is detected, and determines the center of rotation that is calculated, as the installation position of the operating element.

In one aspect, the input device further includes an operation detection unit configured to detect an operation on the operating element based on the installation position of the operating element that is determined by the determination means.

In one aspect, the determination means updates the installation position of the operating element that is stored in the operation detection unit.

A method for determining an installation position of an operating element according to the present invention is directed to an input device including: a display including a capacitance-type touch sensor; and an operating element rotatably attached to the display, the operating element including therein at least one conductive member that can capacitively couple to the touch sensor and is configured to be rotationally moved when the operating element is rotated, the method including: detecting a position of at least one conductive member based on a change in capacitance when an operating element is operated; and determining an installation position of the operating element based on the position of the at least one conductive member that is detected.

In one aspect, the at least one conductive member is disposed diagonally with respect to a center of rotation of the operating element, the detecting includes detecting the position, of the at least one conductive member, that is defined diagonally, and the determining includes calculating a center point of the position, of the at least one conductive member, that is defined diagonally and detected, and determining the center point that is calculated, as the installation position of the operating element.

In one aspect, the detecting includes detecting a locus of the position of the at least one conductive member being rotationally moved, and the determining includes calculating a center of rotation of the at least one conductive member based on the locus of the position of the at least one conductive member that is detected, and determining the center of rotation that is calculated, as the installation position of the operating element.

According to the present invention, by detecting the position of a conductive member included in an operating element and determining the installation position of the operating element based on the detected position of the conductive member, it is possible to greatly reduce the work involved in updating the installation position of a knob when the knob is installed.

DETAILED DESCRIPTION OF THE DISCLOSURE

Embodiments of the present invention will be described. An input device of the present invention provides an input interface between a human and a machine for a KoD mounted on a display including a capacitance-type touch panel (touch sensor). The KoD can be freely mounted at any position on the display, and the shape, size, number, and the like of the KoD are not particularly limited.

Figure 4:
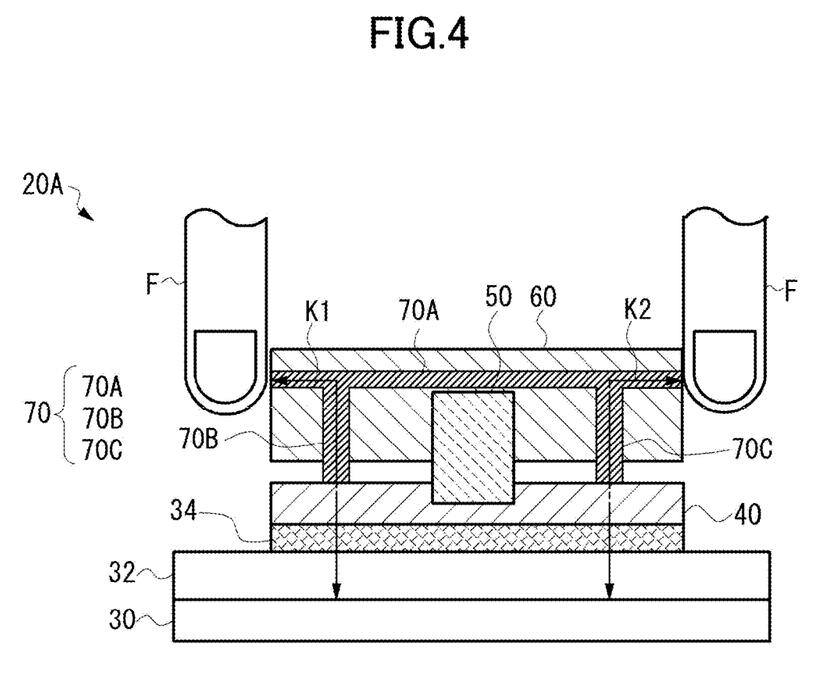
FIG. 4 is a schematic longitudinal cross-sectional view of a knob according to an embodiment of the present invention.

FIG. 4 is a schematic longitudinal cross-sectional view of a knob used in an input device of the present invention. The same reference numerals are used for any components that are the same as those in FIGS. 2A and 2B. A knob 20A according to the present embodiment is attached to an arbitrary position on a touch panel including a touch sensor 30 and a cover glass 32 using an adhesive 34 or the like. The knob 20A includes a cylindrical fixed part 40 and a cylindrical rotating part 60 rotatably attached to the fixed part 40 via a shaft 50. The bottom surface of the fixed part 40 is fixed to the cover glass 32 via the adhesive 34.

The fixed part 40 and the rotating part 60 are made of, for example, an electrically insulating material, and, for example, a metal conductor 70 is provided inside the rotating part 60. The conductor 70 is provided inside the rotating part 60 so as to rotate together with the rotating part 60 when the rotating part rotates. Further, the conductor 70 capacitively couples to the touch sensor 30. In a given embodiment, the conductor 70 has a thin plate-like circular part 70A having a diameter approximately equal to the diameter of the rotating part 60, and a pair of columnar parts 70B and 70C extending in the vertical direction from positions, on the thin plate-like circular part 70A, that are diagonal to each other (i.e., positions that are distanced from each other by 180 degrees about the rotation shaft 50). The shape, size, and the like of the pair of columnar parts 70B and 70C are not particularly limited. For example, the columnar parts are configured to extend in a cylindrical shape. The columnar parts 70B and 70C may be integrally formed with the thin plate-like circular part 70A or may be connected to the thin plate-like circular part 70A.

The tips of the columnar parts 70B and 70C are positioned so as to touch or approach the surface of the fixed part 40 beyond the bottom surface of the rotating part 60. When the rotating part 60 is rotated about the shaft 50, the conductor 70 rotates together, and the tips of the columnar parts 70B and 70C are rotationally moved as if they drew arcs on the surface of the fixed part 40.

As illustrated in FIG. 4, when the user pinches the knob 20A by the side surface with two fingers F, a conductive path K1 passing through a finger F, the thin plate-like circular part 70A, and the columnar part 70B, and a conductive path K2 passing through a finger F, the thin plate-like circular part 70A, and the columnar part 70C are formed, enabling the positions and the like of the columnar parts 70B and 70C to be detected by the touch sensor 30 based on changes in the capacitances on the conductive paths K1 and K2.

In this embodiment, it is determined whether or not a knob is installed, and where a knob is installed, based on (1) the magnitudes of the capacitances and (2) the shape in which detected sets of coordinates are distributed. The outline of this determination is as follows.

(1) Magnitudes of Capacitances

In general, a capacitance detected when the knob 20A is pinched with fingers is smaller than a capacitance detected when the display is directly touched by fingers. This is because, as illustrated in FIG. 4, various members of the knob (the fixed part, the adhesive, and the like) are interposed between the fingers F and the touch sensor 30. On this basis, a threshold value is set in accordance with capacitance values that may be detected via the knob 20A, in order to determine whether the knob, not the display, is touched by fingers, i.e., whether a knob is installed or mounted.

(2) Shape in which Detected Sets of Coordinates are Distributed

As illustrated in FIG. 4, the conductor 70 provided in the knob 20A has the thin plate-like circular part 70A and the pair of columnar parts 70B and 70C situated at positions, on the circular part, that are diagonal to each other. Therefore, the shape in which points to be detected are distributed is fixed with respect to the position of the conductor when the knob 20A is pinched with the fingers F.

Figure 5A:
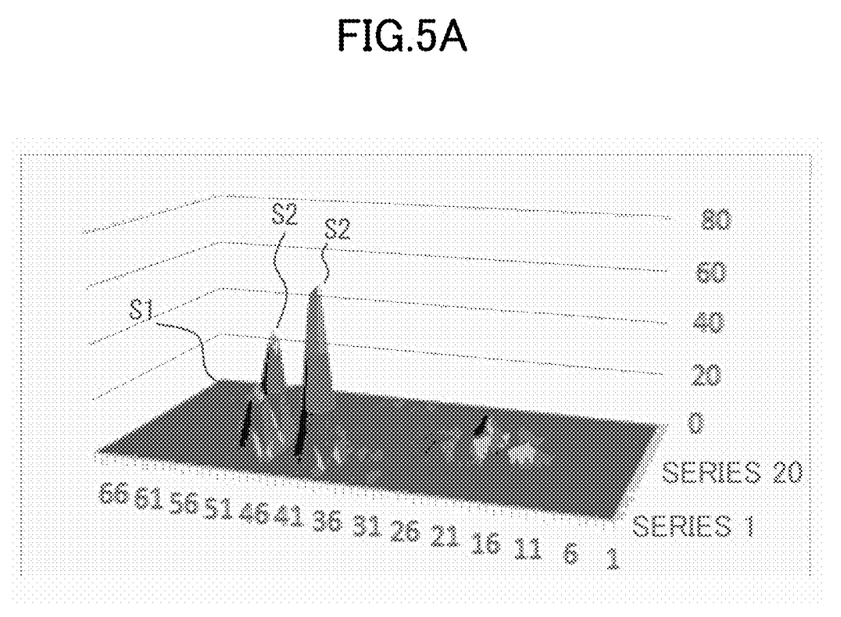
FIG. 5A is a graph illustrating an example of a distribution of capacitances detected when a knob is pinched.

FIG. 5A illustrates a distribution of capacitances detected by the touch sensor 30 when the knob 20A is pinched with the fingers F. S1 representing a small capacitance value corresponds to the position of a finger F approaching the touch sensor, and S2 and S2 representing large capacitance values correspond to the positions of the two columnar parts 70B and 70C of the conductor 70. In response to the two columnar parts 70B and 70C being capacitively coupled to the touch sensor 30, the touch sensor 30 detects two capacitance values S2 and S2 corresponding to the columnar parts 70B and 70C.

Figure 5B:
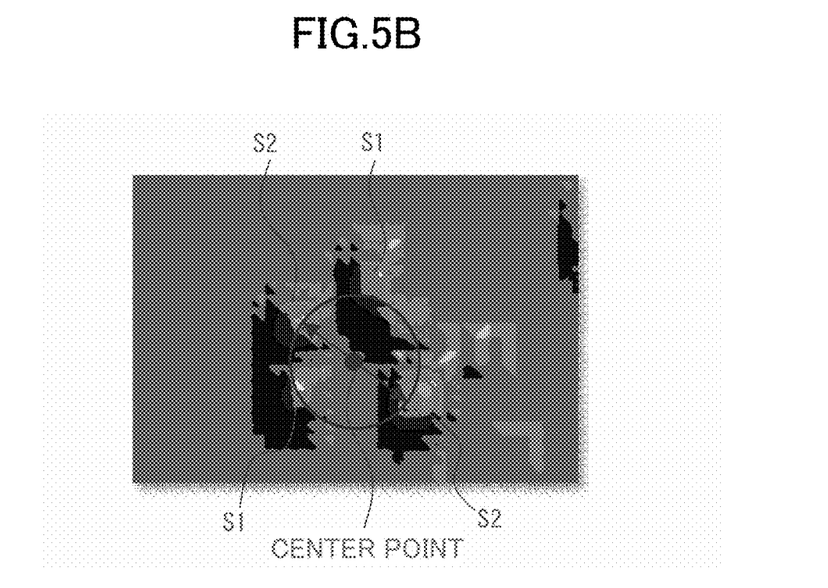
FIG. 5B is a diagram illustrating an example of calculation of a center point based on a detected position of FIG. 5A.

Since the two columnar parts 70B and 70C are positioned diagonally to each other with respect to the center of rotation of the circular part 70A, it is possible to calculate the size of the knob 20A and the center point of the knob 20A based on the diagonal positions of the columnar parts 70B and 70C, and to determine the installation position of the knob 20A. FIG. 5B is the distribution of the detected capacitances illustrated in FIG. 5A, as viewed from above. The two sets of coordinates of the capacitance S2 and S2 indicate the positions of the columnar parts 70B and 70C disposed diagonally to each other, and a center point C between the diagonal positions is calculated, to determine the center point C as the installation position of the knob 20A. The coordinates of two capacitances denoted by S1 and S1 indicate the positions of the two fingers F. In other words, these coordinates indicate the outline of the knob 20A. Therefore, it is possible to determine the size of the knob 20A based on the coordinates of the capacitances S1, or based on the coordinates of the capacitance S2 and the coordinates of the capacitances S1.

Figure 6:
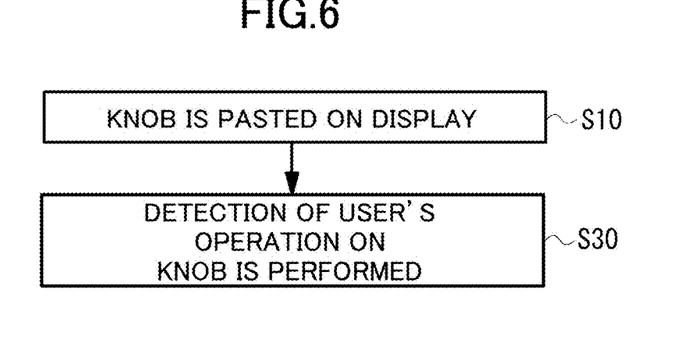
FIG. 6 is a flowchart illustrating a flow of changing or updating the installation position of a knob according to an embodiment of the present invention.

FIG. 6 is a flowchart illustrating the flow for changing or updating the installation position of a knob according to the present embodiment. A user pastes a knob on the display with an adhesive or the like (S10). The calculation unit determines that the knob is installed based on the magnitude of the capacitance, then detects the positions of the columnar parts 70B and 70C of the conductor 70, determines the installation position of the knob based on the detected positions, and automatically updates the previous installation position to the determined installation position. Then, detection of an operation on the knob by the user is performed (S30). In this way, presence or absence of knob installation and an installation position can be determined, and the user no longer needs to perform rewriting of the coordinates of the installation position of the knob into the calculation unit (i.e., the step S20 of FIG. 3) when the knob is attached, unlike as has been done so far.

Figure 7:
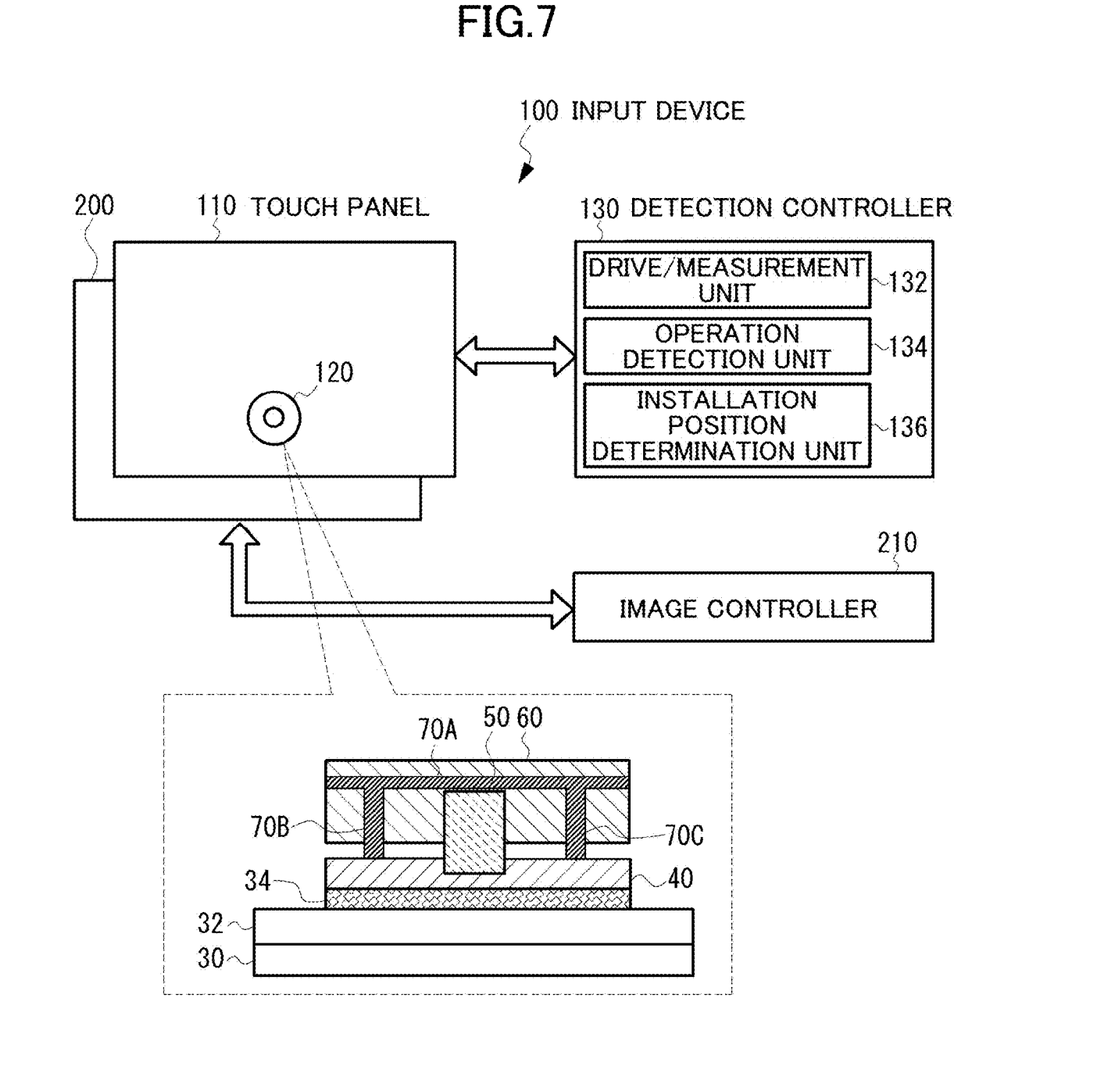
FIG. 7 is a block diagram illustrating the configuration of an input device according to a first embodiment of the present invention.

Next, a first embodiment of the present invention will be described in detail. FIG. 7 is a block diagram illustrating the configuration of an input device according to the first embodiment of the present invention. An input device 100 of the present embodiment includes a capacitance-type touch panel 110, a knob 120 attached to the surface of the touch panel 110, a detection controller 130 configured to detect an operation on the touch panel 110 or the knob 120, a display 200, and an image controller 210.

The touch panel 110 includes, for example, a plurality of detection sensors formed at positions at which a plurality of X-side and Y-side electrode lines intersect, and the detection sensors detect a change in capacitance when a user's fingers, hand, or the like approach or touch the touch panel 110. The touch panel 110 is mounted on the display 200 and provides a user input interface to input buttons such as icons displayed on the display 200. The image controller 210 generates images such as icons displayed on the display 200, and is mounted in, for example, a vehicle-mounted device.

The knob 120 provides a user input interface in cooperation with the touch panel 110. Physical information regarding an operation when the user operates the knob 120 appears as a change in the capacitance of the touch panel 110, and the change in the capacitance is detected. The knob 120 has the same configuration as that of the knob 20A illustrated in FIG. 4, and is constituted by a doughnut-shaped rotary operating element (rotary encoder). The knob 120 can be attached to a desirably selected position of the touch panel 110, and the bottom of the knob 120 is pasted on the surface of the touch panel 110 by, for example, a double-sided adhesive.

The knob 120 includes a cylindrical housing made of an insulating material such as plastic, and a conductor 70 configured to rotate together with the rotation of the knob 120 is provided inside the housing or near the surface of the housing. The shape and the material of the conductor 70 are not particularly limited. Here, the conductor 70 has a thin plate-like circular part 70A and a pair of columnar parts 70B and 70C extending in the vertical direction from positions, on the circular part 70A, that are diagonal to each other. When the knob 120 is rotated, the conductor 70 also rotates together.

The columnar parts 70B and 70C capacitively couple to the detection sensors of the touch panel 110, and the positions of the columnar parts 70B and 70C are detected by the detection controller 130 when the user pinches the knob 120 or rotates the knob 120 with fingers F.

The detection controller 130 is electrically connected to the touch panel 110, controls the entire operation of the touch panel 110, and detects an operation input into the touch panel 110 or the knob 120 by the user. The detection controller 130 is formed of hardware and/or software, and is formed of, for example, a controller including a ROM/a RAM, which is equipped with software for controlling the touch panel 110.

As illustrated in FIG. 7, the detection controller 130 includes a drive/measurement unit 132, an operation detection unit 134, and an installation position determination unit 136. The drive/measurement unit 132 drives a plurality of electrode lines on either or both of the X-side and the Y-side of the touch panel 110, and measures the capacitance of each detection sensor of the driven electrode line. The operation detection unit 134 detects an operation on the touch panel 110 or an operation on the knob 120 based on the capacitance measured by the drive/measurement unit 132.

For example, when the fingers F of the user approach or touch the touch panel 110, the operation detection unit 134 detects the position of the touch on the touch panel 110 based on a change in the capacitance of the corresponding detection sensor.

When the fingers F of the user touch the knob 120, the touch on the knob is detected by the operation detection unit 134 based on a resulting change in the capacitance. A touch on the knob 120, which forms a smaller capacitance, is thus detected differently from a touch on the display. Detection of a touch on the knob 120 can be used to determine whether or not a knob 120 is mounted on the touch panel 110.

Further, when the fingers F of the user touch the knob 120, the position of the conductor is detected by the operation detection unit 134 based on a change in the capacitance on the conductive path through the conductor 70 of the knob 120. In this way, the operation detection unit 134 detects a touch on the touch panel 110 and the touch position, a touch on the knob 120 and the touch position, the position of the conductor of the knob 120, and the like based on a change in the capacitance.

The installation position determination unit 136 determines the installation position of the knob based on the detection result of the operation detection unit 134. When a knob 120 is detected as being mounted on the touch panel 110 by the operation detection unit 134 (that is, when a touch on a knob 120 by the fingers F is detected), the installation position determination unit 136 calculates a center point based on detected positions of the pair of columnar parts 70B and 70C of the conductor 70, and determines the calculated center point as the installation position of the knob 120. Upon determining the installation position of the knob 120, the installation position determination unit 136 writes the coordinates of the installation position in the calculation unit (for example, a memory, a register, or the like of the operation detection unit 134). This enables detection of an operation on the mounted knob. The mounted knob may be any selected from a newly attached knob, a retrofitted knob, and a substituted knob.

Figure 8:
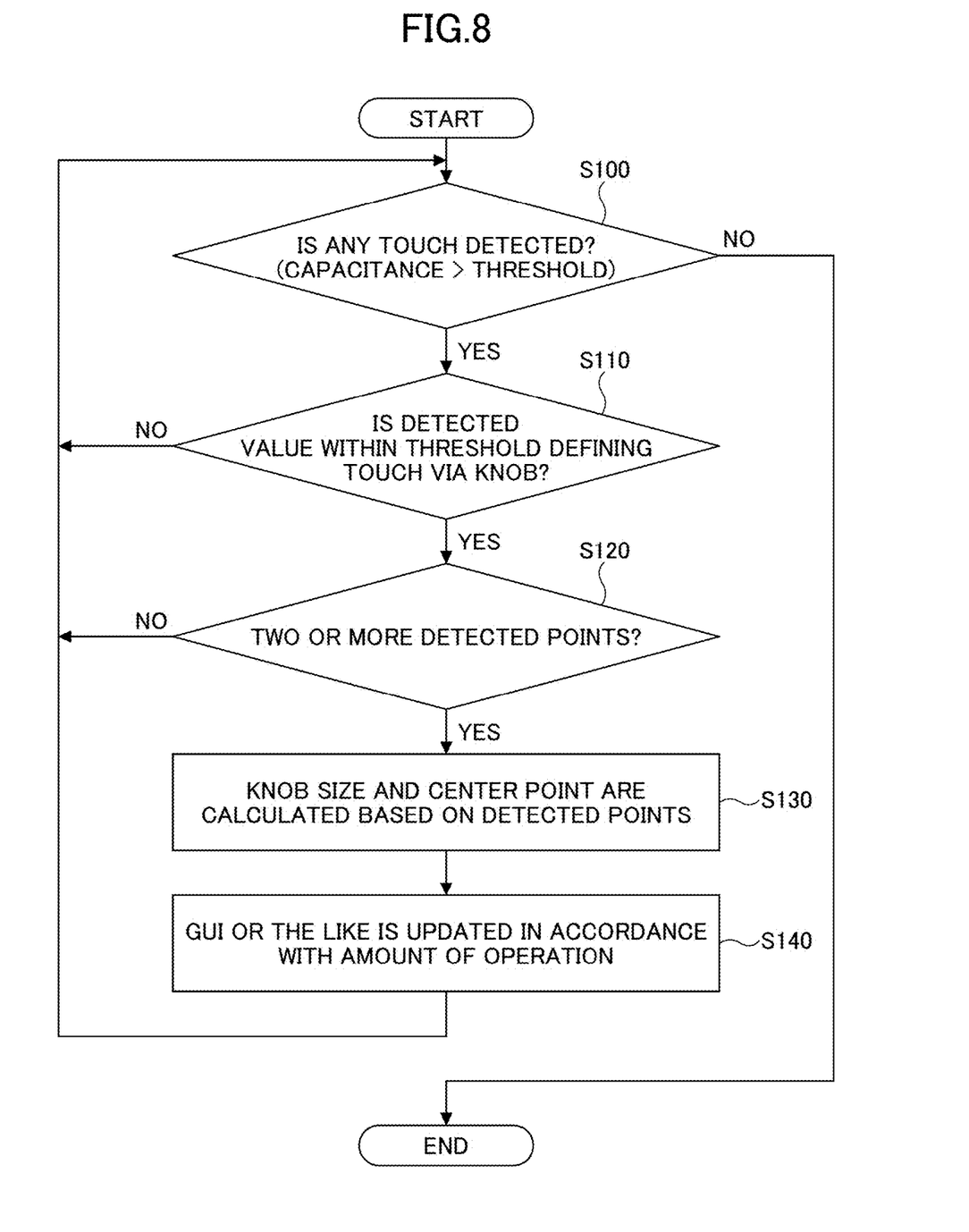
FIG. 8 is a flowchart illustrating an algorithm for detecting an operation on a knob of the input device according to the first embodiment of the present invention.

Next, the knob installation position determination flow according to the present embodiment is illustrated in FIG. 8. First, the installation position determination unit 136 determines whether a touch is detected by the operation detection unit 134 or not (S100). Specifically, a touch is detected when the capacitance is greater than a threshold value.

Next, the installation position determination unit 136 determines whether a detected value is within a threshold value defining a touch via the knob or not (S110). In general, a capacitance detected when the knob 120 is pinched with fingers is smaller than a capacitance detected when the touch panel is directly touched by fingers. This is because various members of the knob (the fixed part, the adhesive, and the like) are interposed between the fingers F and the touch panel 110. Based on this, a threshold value is set in accordance with capacitance values that may be detected via the knob 120, in order to determine whether a knob is mounted on the touch panel 110.

Next, in a case of determining that the touch is via the knob, the installation position determination unit 136 determines whether there are two or more detected points or not (S120). That is, it is determined whether the positions of the two columnar parts 70B and 70C of the conductor 70 are detected or not. In a case of determining that there are two or more detected points, the installation position determination unit 136 calculates the size of the knob and the coordinates of the center point based on the coordinate positions of the detected points (S130). The installation position determination unit 136 determines the calculated center point as the installation position of the knob, and writes this installation position in the calculation unit (for example, the operation detection unit 134 or other arithmetic processing unit).

Figure 9A:
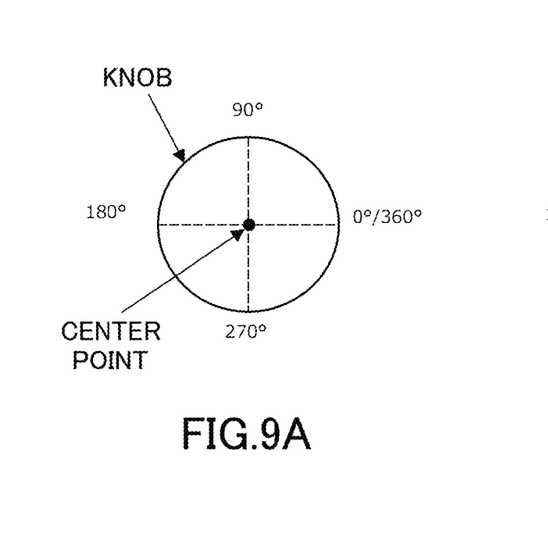
FIG. 9A is a flow diagram illustrating an example of an algorithm for detecting a rotation angle of a knob.
Figures 9B, 9C:
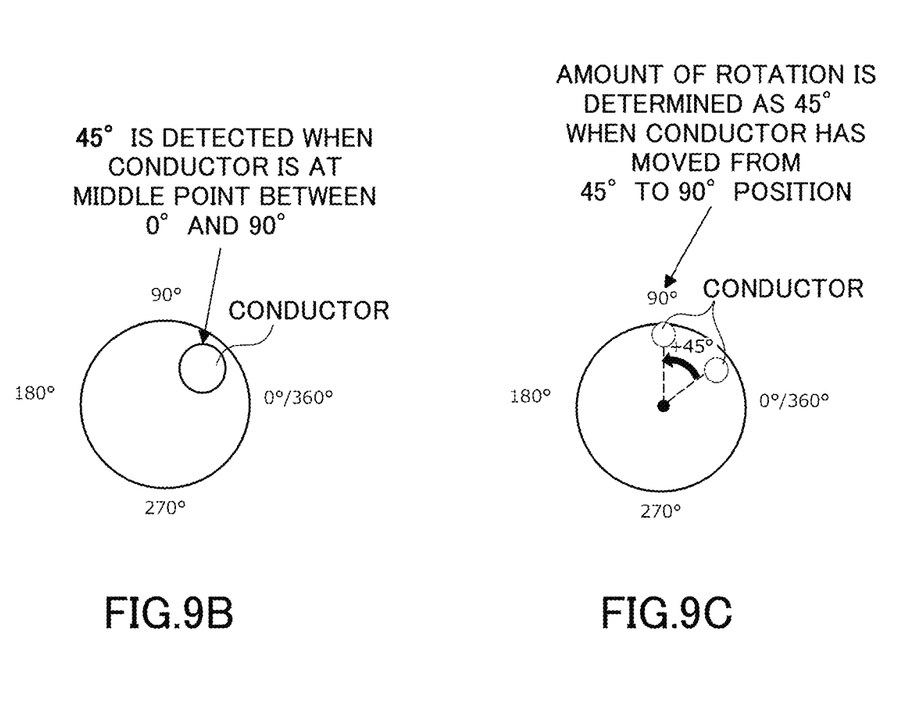
FIG. 9B is a flow diagram illustrating an example of an algorithm for detecting a rotation angle of a knob.
FIG. 9C is a flow diagram illustrating an example of an algorithm for detecting a rotation angle of a knob.

When the writing of the installation position of the knob is completed, detection of an operation on the knob 120 is performed, and the image controller 210 updates a GUI or the like in accordance with the operation on the knob or the like (S140). For example, the amount of an operation is determined in accordance with the rotation angle (the amount of rotational movement of the columnar parts of the conductor) when the knob 120 is rotated. FIGS. 9A to 9C illustrate an example of an algorithm for detecting a rotation angle of the knob. As illustrated in FIG. 9A, a 0-degree position is set as a reference to the coordinates of the center point of the knob. In this example, the right-hand side is set to 0 degrees, and the angle is set to increase counterclockwise. Next, as illustrated in FIG. 9B, the position angle of the conductor provided in the knob is calculated. For example, when the conductor is at the middle point between 0° and 90°, 45° is detected. Next, as illustrated in FIG. 9C, when the position of the conductor is moved from 45° to 90°, the amount of rotation is determined to be 45°.

On the other hand, in a case where it is not determined in step S110 that the touch is via the knob, or in a case where it is not determined in step S120 that there are two or more detected points, the flow returns to the start. On every return to the start, presence/absence of a touch is determined, and in a case of the fingers being away (in a case where no touch is detected), the flow ends.

Thus, according to the present embodiment, since the installation position of the knob is determined based on the points of the conductor that are detected or positions at which the conductor is detected when the knob is attached, and the determined installation position is provided to the calculation unit configured to detect an operation on the knob, the user does not need to write the installation position of the knob into the calculation unit at every knob replacement or every knob installation unlike as has been done so far. Therefore, it is possible to reduce the complexity involved in knob replacement or knob installation, and to improve the convenience of the knob having excellent customizability.

Figure 10A:
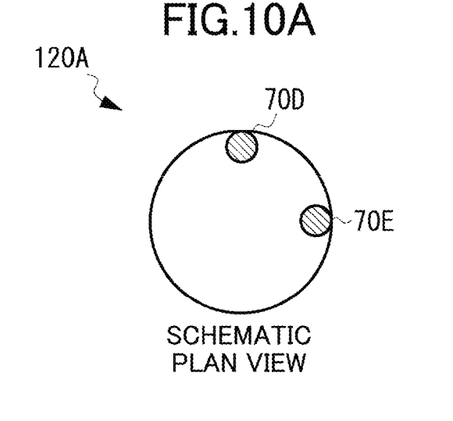
FIG. 10A is a schematic plan view illustrating an example of the configuration of a knob according to a second embodiment of the present invention.

Next, a second embodiment of the present invention will be described. In the first embodiment, the pair of columnar parts 70B and 70C of the conductor 70 are disposed diagonally when detecting the positions of the columnar parts 70B and 70C. In the second embodiment, as illustrated in FIG. 10A, two columnar parts 70D and 70E of the conductor 70 of a knob 120A are not disposed diagonally, but are disposed at a certain angular interval (e.g., 90°) when detecting the positions of the columnar parts 70D and 70E. In another embodiment illustrated in FIG. 10B, the conductor 70 includes one columnar part 70F, and the position of the columnar part 70F is detected.

In the second embodiment, for example, a calibration mode for determining the installation position of the knob is implemented. In the calibration mode, a rotation operation for fully rotating the knob once is performed after the knob is installed, and the installation position and the size of the knob are determined based on the positions at which the conductor are detected, obtained by the rotation operation.

Figure 11A:
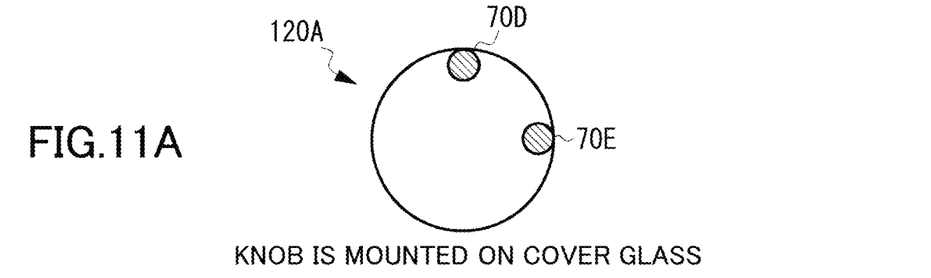
FIG. 11A is a view illustrating a method for determining the installation position of a knob according to the second embodiment of the present invention.
Figure 11B:
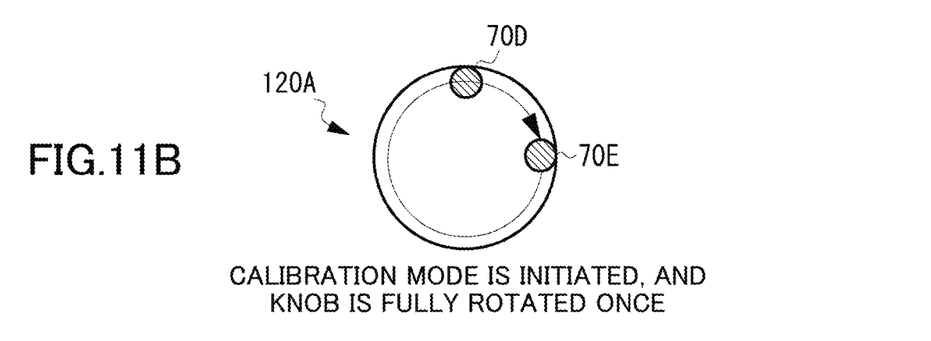
FIG. 11B is a view illustrating a method for determining the installation position of a knob according to the second embodiment of the present invention.
Figure 11C:
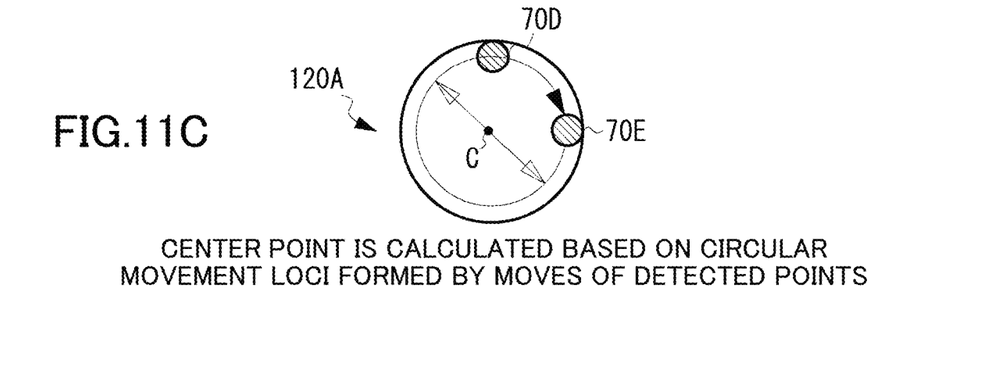
FIG. 11C is a view illustrating a method for determining the installation position of a knob according to the second embodiment of the present invention.

FIGS. 11A to 11C are views illustrating a method for determining the installation position of the knob in the calibration mode. As illustrated in FIG. 11A, the knob 120A illustrated in FIG. 10A is attached to a cover glass. When the knob 120A is pinched with fingers, the positions of the two columnar parts 70D and 70E are detected.

Next, as illustrated in FIG. 11B, the knob 120A is fully rotated once by the fingers in the calibration mode. When the knob 120A is rotated, the columnar parts 70D and 70E are rotationally moved. During the rotation of the knob 120, the drive/measurement unit 132 drives and measures the electrode lines at a constant cycle and detects the positions of the columnar parts 70D and 70E at each cycle.

Next, as illustrated in FIG. 11C, the installation position determination unit 136 calculates the center point C based on detected points, i.e., the shapes of circular loci formed by the rotational moves of the columnar parts 70D and 70E, and determines the center point C as the installation position of the knob.

Figure 10B:
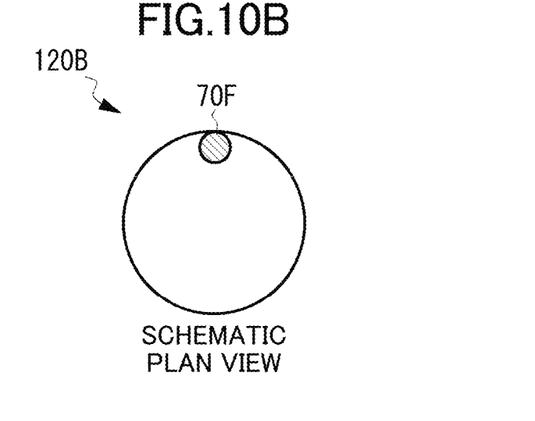
FIG. 10B is a schematic plan view illustrating an example of the configuration of a knob according to a second embodiment of the present invention.

As described above, according to this embodiment, the columnar parts of the conductor do not need to be positioned diagonally to each other in order to enable determination of the installation position of the knob. Further, even when the conductor of the knob 120B includes one columnar part 70F as illustrated in FIG. 10B, rotating the knob 120B makes it possible to determine the installation position of the knob based on the movement locus of the columnar part 70F similarly. Further, in the above example, the knob is fully rotated once. However, as long as the center point can be calculated, the rotation angle of the knob does not necessarily need to be one full rotation, and may be, for example, a half rotation. Furthermore, the number of columnar parts of the conductor is not limited to one or two, and may be three or more.

Although the preferred embodiments of the present invention have been described above, the present invention is not limited to the specific embodiments, and various modifications and changes are applicable within the scope of the spirit of the invention described in the claims.

What is claimed is:

1. An input device, comprising:
a display including a capacitance-type touch sensor;
an operating element rotatably attached to the display, the operating element including therein at least one conductive member that can capacitively couple to the touch sensor and is configured to be rotationally moved when the operating element is rotated; and
a controller configured to
detect a position of the at least one conductive member based on a change in capacitance when the operating element is operated, and
determine an installation position of the operating element based on the position of the at least one conductive member that is detected, wherein
the at least one conductive member includes a pair of columnar parts, each of the pair of columnar parts extending vertically along a side surface, of the operating element, on which fingers of a user are placed to operate the operating element.

2. The input device according to claim 1,
wherein the pair of columnar parts is disposed diagonally with respect to a center of rotation of the operating element, and
the controller is configured to detect a position, of the pair of columnar parts, that is defined diagonally,
calculate a center point of the position, of the pair of columnar parts, that is defined diagonally and detected, and
determine the center point that is calculated, as the installation position of the operating element.

3. The input device according to claim 1,
wherein the controller is configured to detect a locus of the position of the at least one conductive member being rotationally moved, and
calculate a center of rotation of the at least one conductive member based on the locus of the position of the at least one conductive member that is detected, and determines the center of rotation that is calculated, as the installation position of the operating element.

4. The input device according to claim 1,
wherein the controller is configured to detect an operation on the operating element based on the installation position of the operating element.

5. The input device according to claim 4,
wherein the controller is configured to update the installation position of the operating element.

6. A method for determining an installation position of an operating element of an input device including: a display including a capacitance-type touch sensor; and the operating element rotatably attached to the display, the operating element including therein at least one conductive member that can capacitively couple to the touch sensor and is configured to be rotationally moved when the operating element is rotated, the method comprising:
detecting a position of at least one conductive member based on a change in capacitance when an operating element is operated; and
determining an installation position of the operating element based on the position of the at least one conductive member that is detected, wherein
the at least one conductive member includes a pair of columnar parts, each of the pair of columnar parts extending vertically along a side surface, of the operating element, on which fingers of a user are placed to operate the operating element.

7. The method according to claim 6,
wherein the pair of columnar parts is disposed diagonally with respect to a center of rotation of the operating element,
the detecting includes detecting the position, of the pair of columnar parts, that is defined diagonally, and the determining includes calculating a center point of the position, of the pair of columnar parts, that is defined diagonally and detected, and determining the center point that is calculated, as the installation position of the operating element.

8. The method according to claim 6, wherein the detecting includes detecting a locus of the position of the at least one conductive member being rotationally moved, and the determining includes calculating a center of rotation of the at least one conductive member based on the locus of the position of the at least one conductive member that is detected, and determining the center of rotation that is calculated, as the installation position of the operating element.

\* \* \* \* \*